(12) United States Patent
Li et al.

(10) Patent No.: US 11,418,797 B2
(45) Date of Patent: Aug. 16, 2022

(54) MULTI-PLANE TRANSMISSION

(71) Applicant: Advanced Micro Devices, Inc., Santa Clara, CA (US)

(72) Inventors: Adam H. Li, Solana Beach, CA (US); Nathaniel David Naegle, Pleasanton, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/368,269

(22) Filed: Mar. 28, 2019

(65) Prior Publication Data

US 2020/0314436 A1 Oct. 1, 2020

(51) Int. Cl.
| | |
|---|---|
| *H04N 19/176* | (2014.01) |
| *H04N 13/395* | (2018.01) |
| *H04N 19/167* | (2014.01) |
| *H04N 19/179* | (2014.01) |
| *H04N 19/59* | (2014.01) |

(52) U.S. Cl.
CPC ......... *H04N 19/176* (2014.11); *H04N 13/395* (2018.05); *H04N 19/167* (2014.11); *H04N 19/179* (2014.11); *H04N 19/59* (2014.11)

(58) Field of Classification Search
None
See application file for complete search history.

(56) References Cited

U.S. PATENT DOCUMENTS

| | | |
|---|---|---|
| 5,930,390 A | 7/1999 | Coelho |
| 6,524,198 B2 | 2/2003 | Takeda |
| 6,618,397 B1 | 9/2003 | Huang |
| 6,680,976 B1 | 1/2004 | Chen et al. |
| 6,683,988 B1 | 1/2004 | Fukunaga et al. |
| 6,754,234 B1 | 6/2004 | Wiesner et al. |
| 7,397,851 B2* | 7/2008 | Roman ............... H04N 7/12 375/240.01 |
| 7,471,823 B2 | 12/2008 | Ubillos et al. |
| 7,813,000 B2 | 10/2010 | Ternasky et al. |

(Continued)

OTHER PUBLICATIONS

International Search Report and Written Opinion in International Application No. PCT/IB2018/057511, dated Jan. 22, 2019, 8 pages.

(Continued)

*Primary Examiner* — Mikhail Itskovich
(74) *Attorney, Agent, or Firm* — Kowert Hood Munyon Rankin and Goetzel PC; Rory D. Rankin

(57) ABSTRACT

Systems, apparatuses, and methods for performing efficient video transmission are disclosed. In a video processing system, a transmitter identifies multiple planes in a scene. The transmitter renders and compresses each of the multiple planes with a combination of a corresponding compression level and a resolution, which is different from a combination of compression level and resolution of any other plane. For each plane, the transmitter inserts, in multi-plane information, data such as identification of the plane, a location in the video frame for the plane, and one or more of a resolution and compression level for the plane. The transmitter conveys the rendered and compressed planes along with the multi-plane information to a receiver. The receiver decodes each of the planes and insets each of the planes on any lower resolution planes of the multiple planes.

20 Claims, 5 Drawing Sheets

(56) References Cited

U.S. PATENT DOCUMENTS

| | | |
|---|---|---|
| 8,175,181 B1 | 5/2012 | Nabar et al. |
| 9,270,969 B2 | 2/2016 | Hong et al. |
| 9,407,923 B2 | 8/2016 | Barak |
| 9,924,134 B2 | 3/2018 | Glen |
| 10,594,901 B2 | 3/2020 | Sines et al. |
| 2001/0033286 A1 | 10/2001 | Stokes et al. |
| 2005/0223165 A1 | 10/2005 | Schmidt et al. |
| 2006/0171596 A1 | 8/2006 | Sung et al. |
| 2008/0049651 A1 | 2/2008 | Chang et al. |
| 2009/0052537 A1 | 2/2009 | Burazerovic et al. |
| 2009/0148058 A1 | 6/2009 | Dane et al. |
| 2009/0213940 A1 | 8/2009 | Steinbach et al. |
| 2010/0050225 A1 | 2/2010 | Bennett |
| 2010/0157154 A1 | 6/2010 | Kobayashi et al. |
| 2011/0050695 A1 | 3/2011 | Sullivan et al. |
| 2011/0066262 A1 | 3/2011 | Kelly et al. |
| 2011/0157196 A1 | 6/2011 | Nave et al. |
| 2011/0263332 A1 | 10/2011 | Mizrachi |
| 2011/0299606 A1 | 12/2011 | Chen et al. |
| 2012/0008679 A1 | 1/2012 | Bakke |
| 2012/0236934 A1 | 9/2012 | Chen et al. |
| 2012/0243009 A1 | 9/2012 | Chapman et al. |
| 2013/0039594 A1 | 2/2013 | Chen et al. |
| 2013/0053141 A1 | 2/2013 | Guerin et al. |
| 2013/0058394 A1 | 3/2013 | Nilsson et al. |
| 2013/0076771 A1 | 3/2013 | Bachman et al. |
| 2013/0083161 A1 | 4/2013 | Hsu et al. |
| 2013/0335432 A1 | 12/2013 | Iwasaki |
| 2014/0028876 A1 | 1/2014 | Mills |
| 2014/0194196 A1 | 7/2014 | Hoy et al. |
| 2014/0211860 A1 | 7/2014 | Zhao et al. |
| 2014/0267780 A1 | 9/2014 | Spears et al. |
| 2014/0317068 A1 | 10/2014 | Yang et al. |
| 2014/0376612 A1 | 12/2014 | Chen et al. |
| 2016/0381392 A1 | 12/2016 | Wiegand et al. |
| 2017/0142447 A1 | 5/2017 | Toth et al. |
| 2018/0091819 A1 | 3/2018 | Cook et al. |
| 2019/0068983 A1 | 2/2019 | Ryan et al. |
| 2019/0104311 A1 | 4/2019 | Amer et al. |
| 2019/0182308 A1 | 6/2019 | Vu et al. |
| 2020/0250787 A1 | 8/2020 | Cheng et al. |

OTHER PUBLICATIONS

Non-Final Office Action in U.S. Appl. No. 15/686,892, dated Mar. 7, 2019, 14 pages.

Non-Final Office Action in U.S. Appl. No. 15/834,400, dated Feb. 27, 2019, 16 pages.

Final Office Action in U.S. Appl. No. 15/834,400, dated Jul. 10, 2019, 15 pages.

Non-Final Office Action in U.S. Appl. No. 15/721,078, dated Jan. 31, 2019, 9 pages.

\* cited by examiner

MULTI-PLANE TRANSMISSION

BACKGROUND

Description of the Related Art

Video processing algorithms are complex and include many different functions. Computing systems use advanced processors to satisfy the high computation demands. The video processing complexity increases as display resolution increases. Additionally, high definition video encoding applications are growing rapidly in the consumer market space. Further, video processing becomes more complex as the available data bandwidth decreases and the processing occurs in real-time. For example, virtual reality (VR) applications, such as VR gaming applications, are becoming more popular.

For VR applications, a wireless communication link sends a video stream from a computer (or other device) to a virtual reality (VR) headset (or head mounted display (HMD)). Transmitting the VR video stream wirelessly eliminates the need for a cable connection between the computer and the user wearing the HMD, thus allowing for unrestricted movement by the user. The VR video content is typically viewed through a lens to facilitate a high field of view and create an immersive environment for the user. Video compression is already a complex process, but video compression becomes more challenging with VR video transmission over a low-bandwidth wireless link while minimizing any perceived reduction in video quality by the end user.

In view of the above, efficient methods and systems for performing efficient video transmission are desired.

BRIEF DESCRIPTION OF THE DRAWINGS

The advantages of the methods and mechanisms described herein may be better understood by referring to the following description in conjunction with the accompanying drawings, in which.

Figure 1:
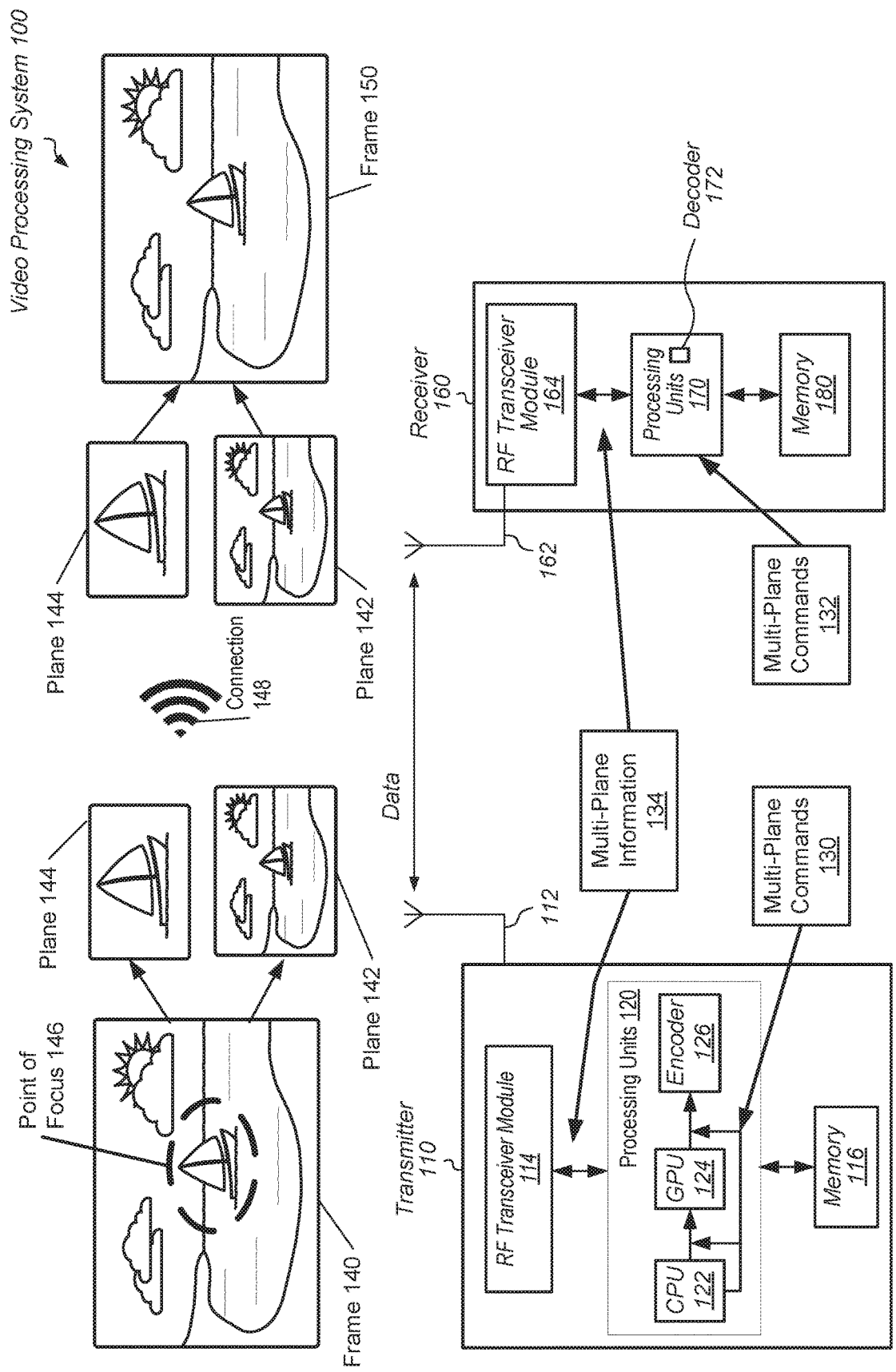
FIG. 1 is a block diagram of one embodiment of a video processing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for performing efficient video transmission are disclosed. In various embodiments, a video processing system includes a transmitter sending a video stream over a wireless link to a receiver. In an embodiment, the transmitter identifies multiple planes in a scene to be depicted on a display device. One or more of the planes include a foveated region, a predicted point of focus, and a region with high contrast edges, and other hints from software and/or hardware. In some implementations, the hints from software include indications specifying one or more of objects in an augmented reality (AR) software application, regions or objects of a scene of a video game software application deemed important by the game developers to the game play or story. In some implementations, the hints from hardware include eye-tracking sensors within a head-mounted display (HMD) determining where the user is currently looking on a screen of a display device and conveying the location information. In some embodiments, the transmitter renders and compresses each of the multiple planes with a combination of a corresponding compression level and a resolution, which is different from a combination of compression level and resolution of any other plane.

In an embodiment, the transmitter inserts, in multi-plane information, data corresponding to the multiple planes. The multi-plane information is in metadata of the rendered and compressed planes. For each plane, the multi-plane information includes identification of the plane and a location in the video frame for the plane. Additionally, the multi-plane information includes one or more of a respective resolution and compression level for the plane. The transmitter conveys the rendered and compressed planes along with the multi-plane information to the receiver. In some embodiments, the transmitter conveys the planes in an order based on one or more of the respective resolutions and compression levels for the planes.

The receiver decodes each of the planes and insets at least one plane on another plane of the multiple planes. In various embodiments, the receiver selects a first plane to inset on a second plane based on one or more of the respective resolutions and compression levels for the planes. In some embodiments, the first plane has a smaller geometric on-screen area than the second plane. In an embodiment, for a same overlapping geometric on-screen area, the first plane has more pixel data than the second plane. In one example, for the same overlapping geometric on-screen area, the receiver determines that the received first plane has a higher resolution or a lower compression level than the received second plane. When the receiver performs this determination, the receiver replaces pixel data of the second plane with pixel data of the first plane in this overlapping geometric on-screen area.

Referring to FIG. 1, a block diagram of one embodiment of a video processing system 100 is shown. The video processing system 100 (or system 100) includes at least a first communications device (e.g., transmitter 110) and a second communications device (e.g., receiver 160) operable to communicate with each other with a limited bandwidth connection. In some embodiments, the limited bandwidth connection is a wired connection. In other embodiments, such as the illustrated embodiment, the limited bandwidth connection is a wireless connection. It is noted that transmitter 110 and receiver 160 can also be referred to as transceivers. Transmitter 110 and receiver 160 are representative of any type of communication devices and/or computing devices. For example, in various implementations, transmitter 110 and/or receiver 160 is one of a mobile phone, a tablet, a desktop computer, a laptop computer, a server, a head-mounted display (HMD), a television, another type of display, router, or other types of computing or communication devices.

In various designs, the transmitter 110 sends video information to the receiver 160 such as rendered information corresponding to the frame 140. Although the frame 140 depicts a picture of a sailboat on a lake, in other examples, the frame 140 includes information for a wide variety of visual information such as a scene of a sporting event, a scene of a video game, and so forth. The transmitter 110 includes any number and type of processors and memory devices for implementing processing units 120 and memory 116. For example, the processing units 120 uses a variety of processors. Examples of the processors are a general-purpose central processing unit (CPU) 122, a graphics processing unit (GPU) 124, an accelerated processing unit (APU), an application specific integrated circuit (ASIC), a field programmable array (FGPA), a video encoder (126), and so forth. Memory 116 uses one or more of a variety of random access memories (RAMs), hard disk drives (HDDs), solid state drives (SSDs), and so forth.

In various implementations, the transmitter 110 uses a communication fabric (or fabric), for high-level interconnects and chip communication. The fabric is not shown for ease of illustration. In various embodiments, different types of traffic flows independently through the fabric. The fabric supports the independent flow by allowing a single physical fabric bus to include a number of overlaying virtual channels, or dedicated source and destination buffers, each carrying a different type of traffic. Each channel is independently flow controlled with no dependence between transactions in different channels.

The CPU 122 uses one or more processor cores with circuitry for executing instructions according to one of a variety of predefined general-purpose instruction sets. In some designs, the processor cores use simultaneous multi-threading techniques combined with out-of-order scheduling and execution of instructions. The GPU 124 uses multiple parallel execution lanes in a single instruction multiple data word (SIMD) micro-architecture. The multiple parallel execution lanes are also referred to as SIMD units or SIMD lanes. The SIMD lanes operate in lockstep. Each of the SIMD lanes independently processes a unit of data independently of other units of data, but uses the same sequence of operations or commands as used by other SIMD lanes. In one example, one or more of an operating system scheduler and a command processor in the GPU schedules commands on the SIMD lanes. In some implementations, the GPU 124 includes a pixel-processing pipeline. In other implementations, the pixel-processing pipeline is located externally from the GPU 124. One or more of the SIMD lanes and the pixel-processing pipeline performs pixel value calculations, vertex transformations, and other graphics operations such as color management, ambient-adaptive pixel (AAP) modification, dynamic backlight control (DPB), panel gamma correction, and dither.

In various implementations, the processing units 120 include the video encoder 126 to encode (i.e., compress) a video stream prior to transmitting the video stream to receiver 160. In various implementations, the video encoder 126 (or encoder 126) is implemented using any suitable combination of hardware and/or software such as firmware. The encoder 126 generates bits in a bitstream and stores them in a buffer. As used herein, a "bitstream" is a sequence of bits. In some cases, the output bitstream of the encoder is measured as a "bitrate," which is a number of bits that are generated or processed per unit of time. For example, in some designs, the bitrate is expressed in units of kilobits per second (kbps) or megabits per second (mbps). As used herein, a "block" is defined as a group of contiguous pixels. For example, in one implementation, a block is a group of 8×8 contiguous pixels that form a square in the image being displayed. In other implementations, other shapes and/or other sizes of blocks are used.

The encoder 126 receives uncompressed, rendered video information and generates the bits in the form of a bitstream in a compressed format that conforms to a standard video compression specification. Examples of the compression specification or standard are a variety of proprietary custom-designed codecs, MPEG-2 Part 2, MPEG-4 Part 2, H.264 (MPEG-4 Part 10), H.265 (High Efficiency Video Coding for supporting the compression of 4K video), Theora, RealVideo RV40, VP9, and AV1. The compression provided by the encoder 126 is typically lossy, so the output compressed video information lacks some of the information present in the original, rendered and uncompressed video information. The video information is typically divided into frames, and the frames are sometimes divided into macroblock, or blocks.

Due to the lossy characteristic of compression, the encoder 126 determines which information of the original, rendered and uncompressed video information to remove while minimizing visual quality degradation of the scene depicted on a display device as viewed by a user. For example, the encoder 126 determines which regions of the block or the frame video information to compress with higher compression ratios and which regions to compress with lower compression ratios. In addition, the compression algorithms track the amount of data used to represent the video, which is determined by the bitrate, while also tracking the storage levels of buffers storing the compressed video information to avoid underflow and overflow conditions. Accordingly, the encoder 126 faces many challenges to support compression of the received, rendered video information while achieving a target compression ratio, minimizing latency of video transmission, preventing overflow and underflow conditions of buffers storing output data, and maximizing user subjective image quality on a display device.

In various embodiments, the transmitter 110 sends the frame 140 as multiple planes to the receiver 160. In one example, the transmitter 110 sends the frame 140 as plane 142 and plane 144. Although two planes are shown in system 100, in other embodiments, the frame 140 includes any number of planes. As used herein, a "plane" is a portion of a scene or it is the entire scene depicted in a video frame with corresponding video information such as metadata and blocks of pixels. The scene being depicted typically includes a background and one or more objects. As used herein, a "plane" is also referred to as an "image." Previously, a frame included a single image with one or more objects, and an "image" was associated with a "frame." Now, each of the transmitter 110 and the receiver 160 process video information of a single frame, which includes two or more images, or in other words, two or more planes. In an embodiment, each of the transmitter 110 and the receiver 160 use metadata stored in multi-plane information 134.

In some embodiments, the multi-plane information 134 is metadata that is stored with the associated rendered and compressed blocks of pixels for the frame 140. However, now, the video information of the frame 140 includes rendered and compressed blocks of pixels of the plane 142 and separate rendered and compressed blocks of pixels of the plane 144. The plane 144 corresponds to the point of focus 146. Although the plane 144 is shown as a rectangle, in other embodiments, the plane 144 uses any one of a variety of shapes such as a circle, an oval, and so on. Similarly, the point of focus 146 is shown as an oval, but in other embodiments, the point of focus 146 uses any one of a variety of shapes.

In various embodiments, the transmitter 110 sends the multi-plane information 134 along with the video information of the frame 140 to the receiver 160. In an embodiment, the multi-plane information 134 indicates a first compression level for the plane 142 and a second compression level for the plane 144. As used herein, a "compression level" is also referred to as an "amount of compression" or a "compression ratio." The larger the compression level or the compression ratio, the greater the amount of compression and the smaller the amount of included video information. Similarly, the smaller the compression level or the compression ratio, the smaller the amount of compression and the greater the amount of included video information.

In some embodiments, the multi-plane information 134 identifies the plane 142 as a first plane of the planes 142-144 meaning that the transmitter 110 sends video information and corresponding multi-plane information 134 of the plane 142 to the receiver 160 prior to transmitting information of any other plane such as plane 144. For example, the transmitter 110 sends video information and corresponding multi-plane information 134 of the multiple planes in an ordered manner. In an embodiment, the ordered manner ranks planes from a lowest resolution plane (highest compression plane) to a highest resolution plane (lowest compression plane), and sends the information according to this rank beginning with the lowest resolution plane (highest compression plane). This particular order allows the receiver 160 to process lower resolution planes first, and following, insert the higher resolution planes.

In various embodiments, the CPU 122 determines that there are multiple planes, such as planes 142 and 144, in the frame 140 based on indications received from software and/or external hardware. In some embodiments, the indications specify that the compression levels differ among particular regions in the video frame greater than a compression threshold, and these regions correspond to planes. For example, the CPU 122 receives indications from a software application or hardware such as a head-mounted display (HMD) regarding which regions of the frame 140 qualify to be planes. For example, the CPU 122 receives an indication of a foveated region from the HMD. The foveated region is determined by where the user is currently looking at the screen as determined by eye-tracking sensors within HMD.

Additionally, the CPU 122 determines which regions of the frame 140 qualify to be planes such as a region with high contrast edges, moving objects in a particular region, and objects predicted to be points of focus. For example, in a scene from a video game, a predicted primary point of focus on the screen of a display device is a foveated region, which is where on the screen the user is actually looking. Typically, the user is looking at a particular region on the screen based on the user's object (e.g., a racecar, a soldier, a football player). A secondary point of focus is one of an opposing player's object, a window displaying statistical data in a bar at the bottom of the screen, and so on. In some implementations, the CPU 122 determines a point of focus based on hints from software that include indications specifying one or more of objects in an augmented reality (AR) software application, regions or objects of a scene of a video game software application deemed important by the game developers to the game play or story.

As used herein, the term "point of focus" is defined as the portion of the frame where each eye is expected to be focusing when a user is viewing the frame. In some cases, the point of focus is determined based at least in part on an eye-tracking sensor detecting the location where the eye is pointing. In other cases, the "point of focus" is determined based on the content of the frame data. For example, a scrollbar at the bottom of the frame with statistics of a video game, scores of sports events, or statistically most likely to be the user's point of focus in the current video frame. In yet other cases, the "point of focus" is determined based on hints from software.

When the CPU 122 determines from received indications that there are multiple planes in a frame, such as the planes 142 and 144 in the frame 140, the CPU 122 sends additional commands 130 to one or more of the GPU 124 and the encoder 126. As described earlier, the CPU 122 determines which regions of the frame 140 qualify to be planes based on indications received from external hardware and/or software. These indications specify one or more of a foveated region in the frame 140, regions of the frame 140 that include a point of focus, and so on. In one embodiment, the CPU 122 sends commands to the GPU 124 to render the frame 140 with a highest resolution. Following, the CPU 122 sends additional commands 130 to the encoder 126 to compress different planes with different compression levels. In one embodiment, the CPU 122 sends commands 130 to the encoder 126 to skip compression for the plane 144, which is a smaller region and a point of focus, but set a high compression level for the plane 142, which is the complete scene in the frame 140.

Additionally, in various embodiments, the CPU 122 sends commands 130 to the GPU 124 to record in an ordered manner metadata, such as the multi-plane information 134, corresponding to the planes 142 and 144. In an embodiment, the GPU 124 inserts, in the multi-plane information 134, an indication specifying that there are two planes in this particular frame 140. Additionally, the GPU 124 inserts, in the multi-plane information 134, location information of the plane 144 such as the plane 144 is located 400 pixels from the left side of the screen and 2600 pixels up from the bottom of the screen. The region is an oval with a long axis of 600 pixels measured in the horizontal direction and a short axis of 200 pixels. If the plane 144 is a circle, then in another embodiment, the GPU 124 inserts, in the multi-plane information 134, the location on the screen of the center of the circle and a radius of the circle. Again, other shapes and dimensions for specifying the plane 144 are possible and contemplated.

In another embodiment, when the CPU 122 determines that there are multiple planes in a frame, such as the planes 142 and 144 in the frame 140, the CPU 122 sends commands to the GPU 124 to change the rendering of the frame 140. In an embodiment, the CPU 122 sends commands to the GPU 124 to render the frame 140 into two separate rendered planes, each with a respective resolution, rather than render the frame 140 with a single resolution. In addition to respective resolutions, in some embodiments, the GPU 124 renders the planes 142 and 144 with respective quality settings and frame rates.

In an embodiment, the CPU 122 sends commands to the GPU 124 to render the plane 144, which is a smaller region and a point of focus, at a higher resolution than the plane 142, which is the complete scene in the frame 140. As described earlier, the CPU 122 additionally sends commands 130 to the GPU 124 to record in an ordered manner metadata, such as the multi-plane information 134, corresponding to the planes 142 and 144. Further, in some embodiments, the CPU 122 sends commands to the encoder 126 to compress the different planes 142 and 144 with different compression levels. In other embodiments, the CPU 122 sends commands to the encoder 126 to compress the different planes 142 and 144 with a same compression level since the planes 142 and 144 already have different rendered resolutions.

When the transmitter 110 sends the rendered and possibly compressed blocks of pixels for the planes 142 and 144 to the receiver 160, the transmitter 110 also sends the multi-plane information 134 corresponding to the planes 142 and 144. As described earlier, the video information of the frame 140 includes rendered and possibly compressed blocks of pixels of the plane 142 and separate rendered and compressed blocks of pixels of the plane 144. In some embodiments, the portion of the multi-plane information 134 for the plane 142 is stored with the rendered and possibly compressed blocks of pixels of the plane 142, and the portion of the multi-plane information 134 for the plane 144 is stored with the rendered and compressed blocks of pixels of the plane 144. In another embodiment, the multi-plane information 134 for each of the plane 142 and the plane 144 is stored together in a particular location among the rendered and compressed blocks of pixels of the planes 142 and 144. Various other storage arrangements of the multi-plane information 134 among the rendered and compressed blocks of pixels of the planes 142 and 144 are possible and contemplated.

Therefore, the receiver 160 receives both the rendered and compressed blocks of pixels of the planes 142 and 144 of frame 140 in addition to the multi-plane information 134 associated with the planes 142 and 144. The receiver 160 uses the multi-plane information 134 to determine a number of planes in the frame 140, the location and geometries of the planes in the frame 140, and compression levels of the planes. In various embodiments, the receiver 160 processes the multiple planes in an ordered manner. In an embodiment, the ordered manner ranks planes from a lowest resolution plane (highest compression plane) to a highest resolution plane (lowest compression plane), and processes the planes according to this rank beginning with the lowest resolution plane (highest compression plane).

In an embodiment, the receiver 160 accesses the multi-plane information 134 and generates commands 132 to decode the lowest resolution plane first, and later process a higher resolution plane by compositing the two planes. In an embodiment, the receiver 160 initially processes the lowest resolution plane 142 (complete scene) before processing the higher resolution plane 144. In some embodiments, the receiver 160 scales the plane 142 (complete scene) by a scale factor found in the multi-plane information 134, and the receiver 160 uses this scale factor to equate the resolution of the resulting frame 150 to the resolution of plane 144 (subset of the complete scene). After processing and scaling the plane 142 (complete scene), the receiver 160 insets the higher resolution plane 144 (point of focus 146) into the plane 142. To perform the insetting, the receiver 160 overwrites pixels in a particular geometrical region of the scaled plane 142 with pixels of the plane 144 using location information in the multi-plane information 134. In an embodiment, the location information includes horizontal and vertical offsets from a particular frame of reference of the frame 140. Other examples of the format and definitions of the location information are possible and contemplated. As shown, the receiver 160 generates the frame 150 by insetting the plane 144 into the plane 142.

As described earlier, in one example, the plane 144 is specified as an oval with a long axis of 600 pixels measured in the horizontal direction and a short axis of 200 pixels. In some embodiments, the receiver 160 maintains the pixels of the plane 142 in portions of horizontal video lines that do not intersect any of the geometrical regions corresponding to other planes as identified by the multi-plane information 134. In contrast, the receiver 160 replaces pixels in portions of horizontal video lines that intersect a geometrical region corresponding to another plane as identified by the multi-plane information 134.

To transfer the rendered and compressed pixels of a frame and the multi-plane information 134, in some implementations, transmitter 110 and receiver 160 communicate wirelessly over the unlicensed 60 Gigahertz (GHz) frequency band. Wireless communication devices that operate within extremely high frequency (EHF) bands, such as the 60 GHz frequency band, are able to transmit and receive signals using relatively small antennas. As shown, system 100 uses the wireless connection 148 for transferring data between the transmitter 110 and receiver 160.

In one implementation, transmitter 110 and receiver 160 communicate in accordance with the Institute of Electrical and Electronics Engineers (IEEE) 802.1 lad standard (i.e., WiGig). In other implementations, transmitter 110 and receiver 160 communicate wirelessly over other frequency bands and/or by complying with other wireless communication protocols, whether according to a standard or otherwise. For example, other wireless communication protocols that can be used include, but are not limited to, Bluetooth®, protocols utilized with various wireless local area networks (WLANs), WLANs based on the Institute of Electrical and Electronics Engineers (IEEE) 802.11 standards (i.e., WiFi), mobile telecommunications standards (e.g., CDMA, LTE, GSM, WiMAX), etc.

In one implementation, the video processing system 100 executes a virtual reality (VR) application for wirelessly transmitting frames of a rendered virtual environment from transmitter 110 to receiver 160. In other implementations, the video processing system 100 includes other types of applications that take advantage of the methods and mechanisms described herein. In one implementation, transmitter 110 includes at least radio frequency (RF) transceiver module 114, processing units 120, memory 116, and antenna 112. RF transceiver module 114 transmits and receives RF signals. In one implementation, RF transceiver module 114 is an mm-wave transceiver module operable to wirelessly transmit and receive signals over one or more channels in the 60 GHz band. RF transceiver module 114 converts baseband signals into RF signals for wireless transmission, and RF transceiver module 114 converts RF signals into baseband signals for the extraction of data by transmitter 110.

It is noted that RF transceiver module 114 is shown as a single unit for illustrative purposes. It should be understood that, in other implementations, the transmitter 110 includes any number of different units (e.g., chips) depending on the implementation of the RF transceiver module 114. Transmitter 110 also includes antenna 112 for transmitting and receiving RF signals. Antenna 112 represents one or more antennas, such as a phased array, a single element antenna, a set of switched beam antennas, etc., that can be configured to change the directionality of the transmission and reception of radio signals. As an example, antenna 112 includes one or more antenna arrays, where the amplitude or phase for each antenna within an antenna array can be configured independently of other antennas within the array.

Although antenna 112 is shown as being external to transmitter 110, in other implementations, antenna 112 is included internally within transmitter 110. Additionally, in other embodiments, transmitter 110 is included in any number of other components, which are not shown to avoid obscuring the figure. Similar to transmitter 110, the components implemented within receiver 160 include at least RF transceiver module 164, processor 170, decoder 172, memory 180, and antenna 162, which are analogous to the components described above for transmitter 110. It should be understood that receiver 160 can also include or be coupled to other components (e.g., a display).

Figure 2:
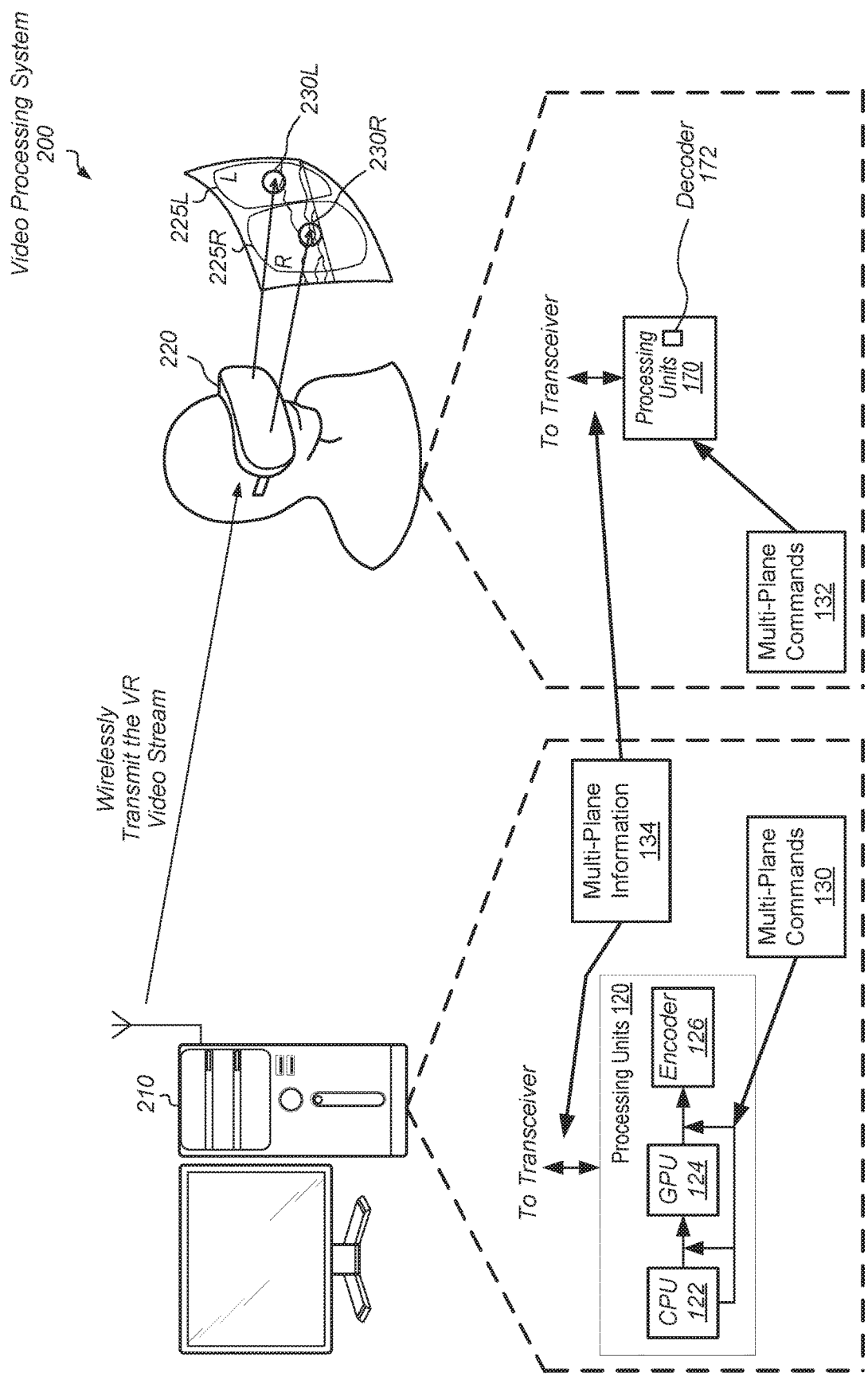
FIG. 2 is a block diagram of another embodiment of a video processing system.

Turning now to FIG. 2, a block diagram of one embodiment of a video processing system 200 is shown. Circuitry, logic and signals previously described are numbered identically. In the illustrated embodiment, the video processing system 200 is a wireless virtual reality (VR) system 200. The video processing system 200 (or system 200) includes at least computer 210 and head-mounted display (HMD) 220. Computer 210 is representative of any type of computing device. Examples of the computer device are one or more processors, memory devices, input/output (I/O) devices, RF components, antennas, and other components indicative of a personal computer or other computing device. In other implementations, other computing devices, besides a personal computer, are utilized to send video data wirelessly to head-mounted display (HMD) 220. For example, computer 210 can be a gaming console, smart phone, set top box, television set, video streaming device, wearable device, a component of a theme park amusement ride, or otherwise. In addition, in other implementations, HMD 220 can be a computer, desktop, television or other device used as a receiver connected to a HMD or other type of display.

Computer 210 and HMD 220 each include circuitry and/or components to communicate wirelessly. It is noted that while computer 210 is shown as having an external antenna, this is shown merely to illustrate that the video data is being sent wirelessly. It should be understood that, in other embodiments, computer 210 has an antenna internal to the external case of computer 210. Additionally, while computer 210 can be powered using a wired power connection, HMD 220 is typically battery powered. Alternatively, computer 210 can be a laptop computer (or another type of device) powered by a battery.

In one implementation, computer 210 includes circuitry, such as one or more of CPU 122 and GPU 124, which dynamically renders a representation of a VR environment to be presented to a user wearing HMD 220. For example, the CPU 122 executes a software application with instructions for rendering the VR environment and CPU 122 sends rendering commands to the GPU 124 and encoding (compressing) commands to the encoder 126. The commands include multi-plane commands 130 for the multiple planes in a frame. One or more of the CPU 122 and the GPU 124 generates the multi-plane information 134 to accompany the rendered and compressed blocks of pixels of the multiple planes of the frame. In other implementations, computer 210 includes other types of processors, including an application specific integrated circuit (ASIC), a field programmable gate array (FPGA), a digital signal processor (DSP), or other processor types.

As described earlier, the multi-plane information 134 includes identification of points of focus such as a foveated region. One or more of the CPU 122 and the GPU 124 determines the point of focus is one of multiple planes of the frame. In an example, the foveated region is located at 2200 pixels from the left side of the screen and 1300 pixels up from the bottom of the screen. The region is a circle with a radius of 700 pixels measured in the horizontal direction. In other examples, the distances are measured as a percentage of the screen width or a variety of other units. In some embodiments, particular identifiers are used to indicate that the information corresponds to a primary foveated region. The identifiers also indicate the type of dimensions being provided. In other embodiments, the locations of the values indicate the type of the dimensions being provided.

In some embodiments, the frame includes multiple planes. For example, a primary plane is a foveated region determined by where the user is currently looking at the screen. A secondary plane is a predicted point of focus. As described earlier, in a scene from a video game, a primary plane on the screen is where the user is actually looking such as at the user's object (e.g., a race car, a soldier, a football player), which is under the user's game control. A secondary plane is an opposing player's object, a window displaying statistical data in a bar at the bottom of the screen, and so on. In some embodiments, the secondary plane has a lower resolution than the primary plane, but a higher resolution than a background plane.

In some embodiments, the multi-plane information 134 also includes identifiers of one or more objects in motion. As an example, a first moving object has an object identifier of five, and a second moving object has an object identifier of eight. For each of the identified moving objects, the corresponding planes have a lower resolution than planes with points of focus but higher resolution than a background plane. If the computer 210 determines the moving object has a similar resolution as the background plane, then in some embodiments, the computer 210 does not generate a separate plane for the moving object.

In an embodiment, one or more of the CPU 122 and the GPU 124 insert, in the multi-plane information 134, information that identifies a high contrast region in the frame. For example, particular pixels correspond to blades of grass in a region. Therefore, one or more of the CPU 122 and the GPU 124 generate another plane of multiple planes of the frame and insert location information of the plane in the multi-plane information 134. Although shapes of a circle and an oval are used as examples in the multi-plane information 134, it is possible and contemplated that the multi-plane information 134 uses a variety of other shapes and corresponding dimensions. For example, in some embodiments, the multi-plane information 134 includes a three-dimensional (3-D) direction vector to indicate a foveated region. In other embodiments, the multi-plane information 134 includes pairs of values where the first value is a type value indicating the type of content and the second value indicates the value in given units for the content indicated by the first value. In yet other embodiments, the position in a list of values indicates the type of the content or the units.

Returning to the receiver device, HMD 220 includes circuitry to receive and decode a compressed bitstream sent by computer 210 to generate frames of the rendered VR environment. HMD 220 then drives the generated frames to the display integrated within HMD 220. Within each image that is displayed on HMD 220, the scene 225R being displayed on the right side 225R of HMD 220 includes a focus region 230R while the scene 225L being displayed on the left side of HMD 220 includes a focus region 230L. These focus regions 230R and 230L are indicated by the circles within the expanded right side 225R and left side 225L, respectively, of HMD 220.

In one implementation, the locations of focus regions 230R and 230L within the right and left half frames, respectively, are determined based on eye-tracking sensors within HMD 220. In another implementation, the locations of focus regions 230R and 230L are specified by the VR application based on where the user is expected to be looking. It is noted that the size of focus regions 230R and 230L can vary according to the implementation. For example, in one implementation, if HMD 220 includes eye-tracking sensors to track the in-focus region based on where the gaze of each of the user's eyes is directed, then focus regions 230R and 230L can be relatively smaller. Otherwise, if HMD 220 does not include eye-tracking sensors, and the focus regions 230R and 230L are determined based on where the user is statistically likeliest to be looking, then focus regions 230R and 230L can be relatively larger. In other implementations, other factors can cause the sizes of focus regions 230R and 230L to be adjusted. For example, in one implementation, as the link quality between computer 210 and HMD 220 decreases, the size of focus regions 230R and 230L decreases.

In one implementation, the computer 210 determines blocks of one or more planes within focus regions 230R and 230L have the lowest amount of compression (highest resolution) to maintain the highest subjective visual quality and highest level of detail for the pixels within these planes. For a neighboring plane outside of focus regions 230R and 230L, the encoder 126 uses a higher amount of compression, resulting in a lower subjective visual quality for the pixels being presented in these planes. This approach takes advantage of the human visual system with each eye having a large field of view but with the eye focusing on only a small area within the large field of view. Based on the way that the eyes and brain perceive visual data, a person will typically not notice the lower quality in the area outside of the planes corresponding to the focus region.

Figure 3:
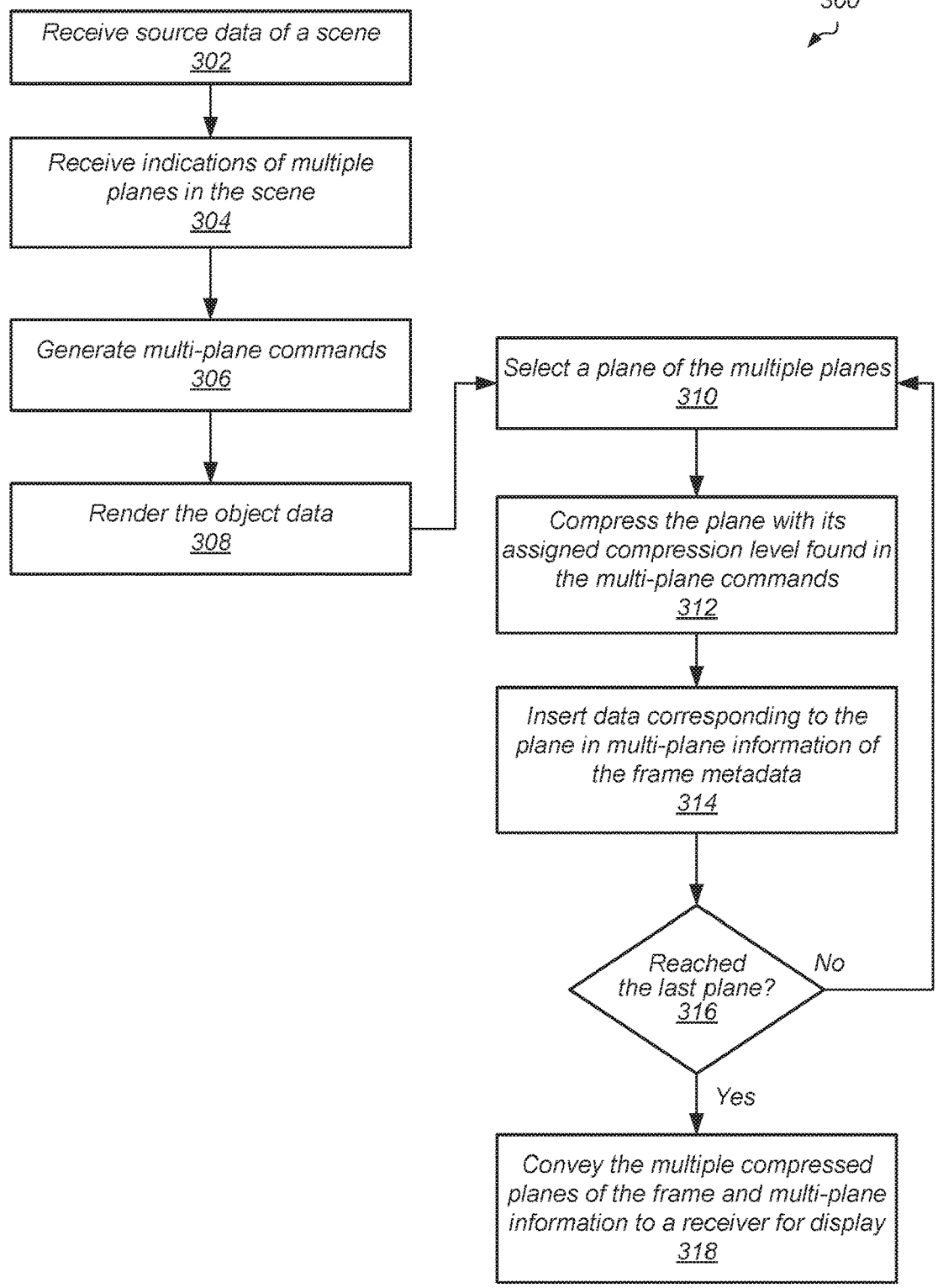
FIG. 3 is a flow diagram of one embodiment of a method for performing efficient video transmission.

Referring now to FIG. 3, one embodiment of a method 300 for performing efficient video transmission is shown. For purposes of discussion, the steps in this embodiment (as well as in FIGS. 4-5) are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 300-500.

A processor receives source data of a scene to be depicted on a screen of a display device (block 302). The source data includes one or more of captured image data and geometric descriptions such as models of primitives generated by a software application. Examples of the primitives are straight lines, a variety of curved lines, and shapes such as rectangles, polygons, and circles. In some embodiments, the processor is a CPU. In other embodiments, the processor is an accelerated processing unit (APU), another processing unit, or other logic that combines the functionality of a CPU and a GPU. In some embodiments, the APU, another processing unit or other logic combines the functionality on a single semiconductor die. Although the following steps are described as being performed by a CPU or a GPU, it is understood that an APU, another processing unit, or other logic is also capable of performing these steps.

In an embodiment, the processor receives a pointer to a location in memory storing the source data. A software application executing on the processor begins processing the source data to create a scene to depict on a screen of a display device. As the processor executes the software application, the processor marks objects for rendering, or otherwise, communicates that particular objects and/or regions, where each region includes one or more objects, have visually significant properties. In some designs, the CPU tags these regions.

One or more of external hardware and software identifies the multiple planes in a scene and sends indications of these planes to the processor (or processing unit). The processor (or processing unit) receives the indications of the multiple planes (block 304). In some embodiments, each video frame processed by a video processing system includes at least two planes. Therefore, the video processing system does not determine whether to process multiple planes in a given video frame. Rather, the video processing system is set up to function with the understanding that each video frame includes two or more planes. In other embodiments, the video processing system is capable of switching between processing a first video frame with a single plane and processing a second video frame with multiple planes, and vice-versa. In such cases, the video processing system performs an initial determination of whether there are multiple planes in a given video frame before attempting to identify the multiple planes. The remainder of the description for method 300 describes the cases when there are multiple planes in a video frame.

To identify the multiple planes in the video frame, in various embodiments, one or more of software and hardware determines candidates to be planes and sends indications of these candidates to the CPU. Examples of these candidates are regions with one or more objects with visually significant properties as determined by a software application being executed by the CPU and external hardware such as a head-mounted display (HMD) that sends information to a transmitter in a computing system using the CPU. As described earlier, these regions include foveated regions, regions with predicted points of focus, regions with high contrast edges, and so on. In various embodiments, the received candidates are automatically qualified to be planes. Therefore, in these embodiments, the qualification of the candidates to be planes is performed by one or more of a software application executed by the CPU and a head-mounted display or other external hardware.

In other embodiments, one or more of the CPU and the GPU determine which candidates qualify to be planes. For example, a software application determines an object, such as a fumbled football lying on the field of play located at the bottom of a screen of a display device, is a visually significant object. Accordingly, the software application provides an indication of this object to the CPU. However, eye-tracking sensors within a head-mounted display (HMD) determine the user is currently looking at the game clock on the scoreboard at the top of the screen of the display device. In some embodiments, the CPU determines a first object corresponding to the football is a candidate to be a plane based on the received indication from the software application. The CPU also determines a second object corresponding to the game clock is a candidate to be a plane based on the indication received from the HMD. In some embodiments, the CPU qualifies each of the first object and the second object to be planes with no further decision making. In other embodiments, the CPU determines the second object has higher priority than the first object due to receiving the indication of the second object from the HMD, which provides an indication of where the user is currently looking. Therefore, in an embodiment, the CPU qualifies the second object as a plane while disqualifying the first object as a plane.

In yet other embodiments, the CPU sends an indication of both candidates to the GPU, and the GPU uses the same priorities, but also determines the distance between the game clock (second object) and the football (first object) is greater than a distance threshold. Therefore, in one embodiment, the GPU qualifies the second object as a plane while disqualifying the first object as a plane. However, if the determined distance is less than the distance threshold, then in an embodiment, the GPU qualifies each of the first object and the second object as planes. In still other embodiments, the GPU further qualifies a candidate to be a plane based on the size of the region corresponding to the candidate. For example, the CPU is unaware of whether a tagged region, which includes one or more objects, is large enough for a user to see subjectively well. The CPU relies on the GPU to determine whether the tagged region is visually significant and determine the geometrical shape, size and location in the frame of the tagged region. When the tagged region is also a candidate to be a plane, in an embodiment, the GPU qualifies the candidate if the determined size is greater than a size threshold. In some embodiments, one or more of the size threshold, the distance threshold and other thresholds are stored in programmable configuration and status registers. If the determined size of the candidate is less than the size threshold, then, in an embodiment, the GPU disqualifies the candidate as a plane.

In addition to the above examples, in some embodiments, one or more of the CPU and the GPU monitor a count of a number of candidates. In an embodiment, a programmable register stores a count threshold. If one or more of the CPU and the GPU determine the number of candidates is greater than the count threshold, then one or more of the CPU and the GPU disqualify candidates until the number of remaining candidates is less than the count threshold. In other embodiments, there is no limit to the number of candidates, and each candidate automatically qualifies to be a plane. Therefore, one of a CPU, an APU and other processing unit receives a number N of candidates to be planes based on indications received from software or indications received from a HMD or other external hardware. Here, N is a positive, non-zero integer. In some embodiments, the CPU, the APU or other processing unit qualifies M candidates to be planes in a frame. Here, M is a positive, non-zero integer that does not exceed N. In other embodiments, none of the CPU, the APU or other processing unit qualifies candidates to be planes in a frame, and each candidate identified by hints from software and/or external hardware becomes a plane. In such cases, M equals N.

In various embodiments, the CPU, an APU or other processing unit generates multi-plane commands (block 306). Although the following steps are described as being performed by a CPU, it is understood that an APU, another processing unit, or other logic is also capable of performing these steps. In some embodiments, the CPU generates multi-plane commands to direct the GPU to render only the plane with the complete video frame (complete scene) with a particular resolution. In some designs, the particular resolution is the highest available resolution. In addition, the CPU generates the multi-plane commands to direct the encoder to compress each of the multiple planes with a respective compression level. Method 300 describes such embodiments in blocks 306-318. In other embodiments, the CPU generates the multi-plane commands to direct the GPU to render each of the multiple planes with a respective resolution. In addition, in these other embodiments, the CPU generates the multi-plane commands to direct the encoder to compress each of the multiple planes with a uniform compression level. These other embodiments are further described in the upcoming description for method 400 (of FIG. 4). Returning to block 306, the CPU generates the multi-plane commands to direct the GPU to render only the plane with the complete video frame (complete scene) with a particular resolution. In an embodiment, the CPU also inserts, in the multi-plane commands, the geometric description of objects located in the planes. The CPU sends these multi-plane commands to the GPU. The CPU also sends multi-plane commands directed toward compression to the encoder.

The GPU renders the object data (block 308). In some embodiments, the GPU renders the object data of the entire video frame with a single resolution such as a highest available resolution supported by a target display device. One or more of the CPU and the GPU of the transmitter assigns a respective compression level to each of the planes. In some embodiments, the respective compression levels are selected prior to rendering the objects. In other embodiments, the respective compression levels are selected after rendering the objects. One or more of the CPU, the GPU, an APU or other logic determine the respective compression levels before sending data to the encoder. In one example, the GPU determines whether a tagged region includes high contrast edges. In another example, the GPU performs a pre-rendering pass on a tagged object or objects and determines through a deep learning technique or other technique that a region is predicted to be a point of focus. In various embodiments, the GPU predicts a low compression level for regions with high contrast edges, predicted points of focus, foveated regions, and so on.

The transmitter selects a plane of the multiple planes (block 310). In an embodiment, the transmitter ranks planes from a lowest resolution plane (highest compression plane) to a highest resolution plane (lowest compression plane). The transmitter sends the rendered pixels to an encoder in an order based on the ranking. Therefore, in an embodiment, the transmitter sends the lowest resolution plane first to the encoder. The encoder compresses the selected plane with its assigned compression level (block 312). The encoder or external logic adjusts encoding parameters accordingly to achieve the assigned compression level.

The transmitter inserts data corresponding to the plane in multi-plane information of the frame metadata (block 314). The multi-plane information is in metadata of the rendered and compressed planes. For each plane, the multi-plane information includes identification of the plane and a location in the video frame for the plane. Additionally, the multi-plane information includes one or more of a resolution and compression level for the plane. If the last plane is not reached ("no" branch of the conditional block 316), then control flow of method 300 returns to block 310 where the transmitter selects another plane. If the last plane is reached ("yes" branch of the conditional block 316), then the transmitter conveys the rendered and compressed planes of the frame and metadata to a receiver for display (block 318). As described earlier, one or more of the elements described for method 300 (and methods 400-500) are performed concurrently or in a different order than shown. Therefore, in some embodiments, the transmitter conveys the rendered planes of the frame and corresponding metadata to a receiver for display at the completion of compressing the plane and creating the metadata for the plane. In such embodiments, the transmitter does not wait for compression to complete for all of the planes before conveying the data of the planes to the receiver. In such cases, the transmitter transfers the data of the planes to the receiver in a pipelined manner.

Figure 4:
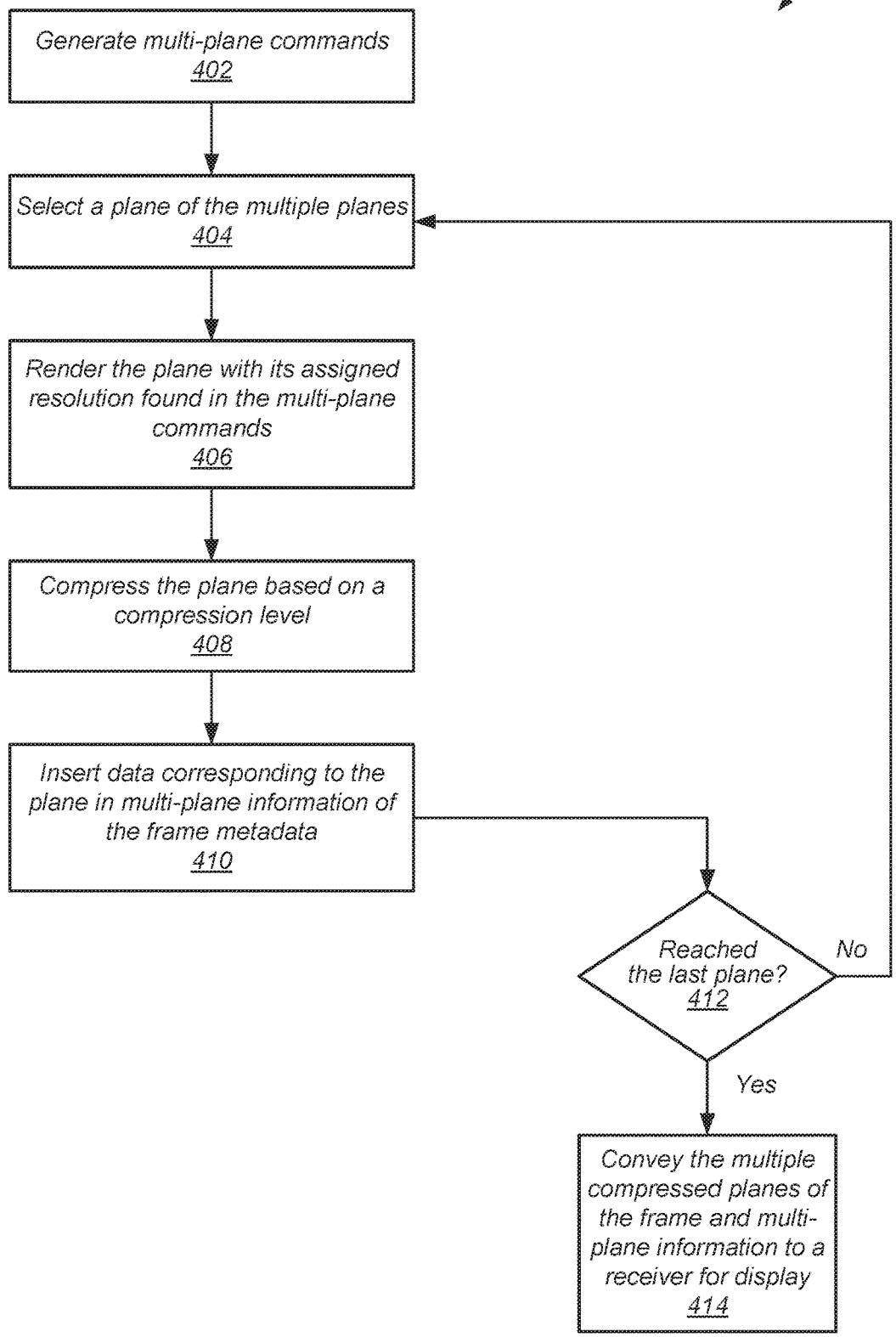
FIG. 4 is a flow diagram of one embodiment of a method for performing efficient video transmission.

Referring now to FIG. 4, one embodiment of a method 400 for performing efficient video transmission is shown. In various embodiments, a CPU, an APU or other processing unit generates multi-plane commands (block 402). In many designs, the video processing system already performed the steps described earlier for the blocks 302-304 of the method 300 (of FIG. 3). Although the following steps are described as being performed by a CPU, it is understood that an APU, another processing unit, or other logic is also capable of performing these steps. In various embodiments, the CPU generates the multi-plane commands to direct the GPU to render each of the multiple planes with a respective resolution. In addition, the CPU generates the multi-plane commands to direct the encoder to compress each of the multiple planes with a uniform compression level. In an embodiment, the CPU also inserts, in the multi-plane commands, the geometric description of objects located in the planes. The CPU sends these multi-plane commands to the GPU. The CPU also sends multi-plane commands directed toward compression to the encoder.

The transmitter selects a plane of the multiple planes (block 404). In an embodiment, the transmitter ranks planes from a lowest resolution plane (highest compression plane) to a highest resolution plane (lowest compression plane). The transmitter sends the pixels to the GPU for rendering in an order based on the ranking. The GPU renders the object data of the selected plane with its assigned resolution (block 406). In some embodiments, the transmitter renders each of the planes before compressing any of the planes. In other embodiments, the transmitter begins compressing rendered pixels while the GPU renders other object data. The encoder of the transmitter compresses the selected plane based on an assigned compression level (block 408). In various embodiments, the assigned compression level is found in the mulita-plane information. In some embodiments, one or more of the CPU and the GPU determines the compression level for each plane as described earlier. In other embodiments, the encoder uses a same compression level for each plane since the GPU renders the planes with respective resolutions.

The transmitter inserts data corresponding to the plane in multi-plane information of the frame metadata (block 410). The multi-plane information includes data as previously described such as at least identification of the plane, a location in the video frame for the plane, and one or more of a respective resolution and compression level for the plane. If the last plane is not reached ("no" branch of the conditional block 412), then control flow of method 400 returns to block 404 where the transmitter selects another plane. If the last plane is reached ("yes" branch of the conditional block 412), then the transmitter conveys the rendered and compressed planes of the frame and corresponding metadata to a receiver for display (block 414). As described earlier, one or more of the elements described for method 400 are performed concurrently or in a different order than shown. Therefore, in some embodiments, the transmitter conveys the rendered and compressed planes of the frame and corresponding metadata to a receiver for display at the completion of compressing the plane and creating the metadata for the plane. In such embodiments, the transmitter does not wait for compression to complete for all of the planes before conveying the data of the planes to the receiver.

Figure 5:
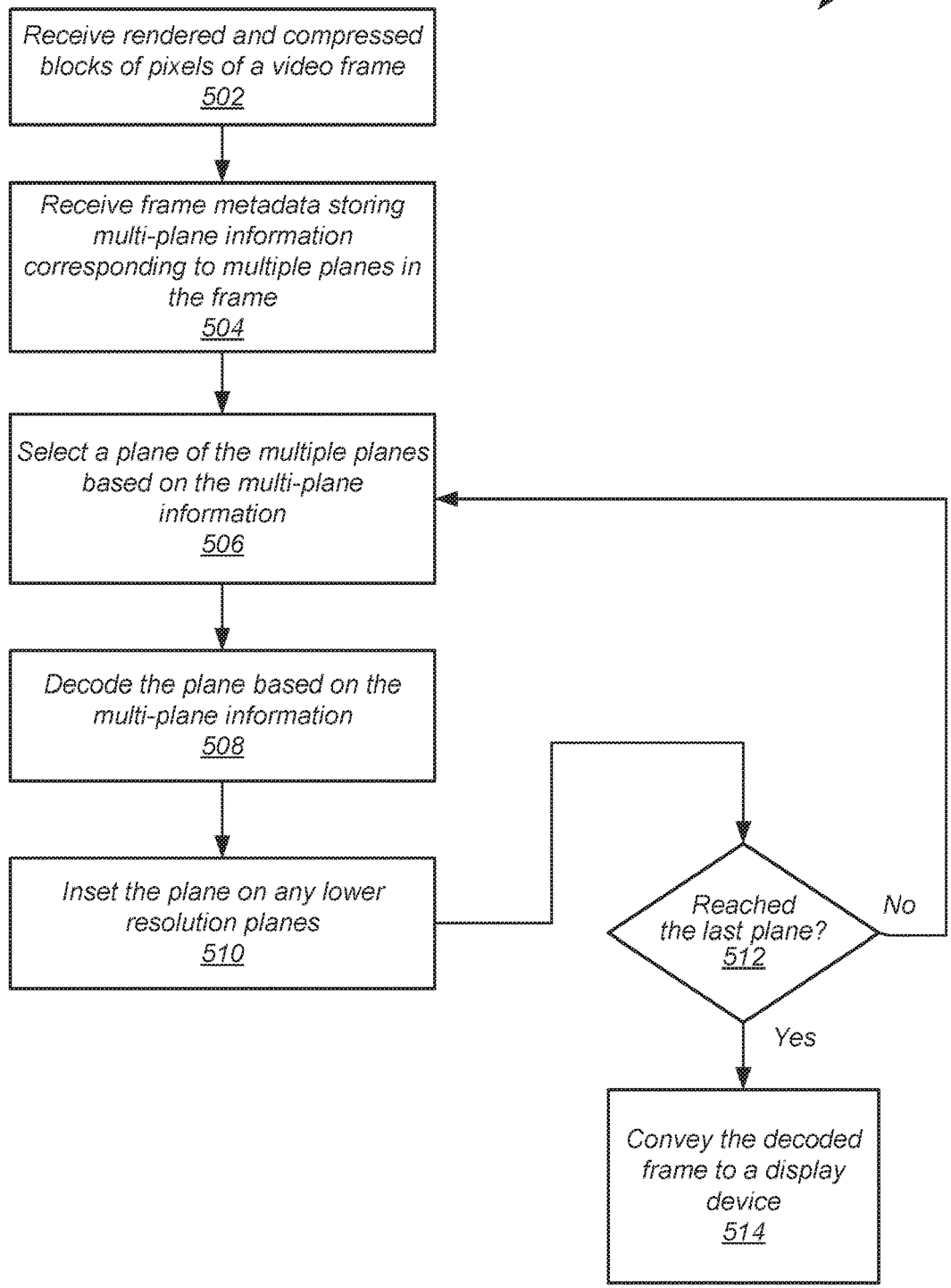
FIG. 5 is a flow diagram of one embodiment of a method for performing efficient video reception.

Referring now to FIG. 5, one embodiment of a method 500 for performing efficient video reception is shown. A receiver of a video processing system receives rendered and compressed blocks of pixels of a video frame (block 502). The receiver also receives frame metadata storing multi-plane information corresponding to multiple planes in the frame (block 504). The multi-plane information includes data as previously described such as at least identification of the planes, a location in the video frame for the planes, and one or more of a resolution and compression level for the planes. As described earlier, one or more of the elements described for method 500 (and methods 300-400) are performed concurrently or in a different order than shown. Therefore, in some embodiments, the receiver receives the metadata concurrently with the rendered and compressed pixel data of a corresponding plane. For example, in some embodiments, the multi-plane information is stored in a header of the packet of the corresponding plane. In addition, the receiver begins processing rendered and compressed pixel data of received planes before receiving data of each plane of the video frame. For example, the receiver begins performing one or more of the steps of the upcoming blocks 506-514 before receiving data of each plane of the video frame.

The receiver selects a plane of the multiple planes based on the multi-plane information (block 506). In an embodiment, the multi-plane information ranks planes from a lowest resolution plane (highest compression plane) to a highest resolution plane (lowest compression plane). This particular order allows the receiver to process lower resolution planes first, and following, insert the higher resolution planes. In some embodiments, the planes arrive from the transmitter in this order, and the receiver simply selects planes in the order that the receiver receives the data and metadata of the planes. The receiver decodes the plane based on the multi-plane information such as the resolution and compression level information (block 508).

The receiver insets the plane on any lower resolution planes (block 510). In some embodiments, the receiver maintains the pixels of the lower resolution (higher compression) plane, which was decoded before the selected plane, in portions of horizontal video lines that do not intersect any of the geometrical regions corresponding to the selected plane as identified by the multi-plane information for the selected plane. In contrast, the receiver replaces pixels in portions of horizontal video lines that intersect a geometrical region corresponding to the selected plane as identified by the multi-plane information for the selected plane. If the last plane is not reached ("no" branch of the conditional block 512), then control flow of method 500 returns to block 506 where the receiver selects another plane. If the last plane is reached ("yes" branch of the conditional block 512), then the receiver conveys the decoded frame to a display device (block 514). As described earlier, one or more of the elements described for method 500 are performed concurrently or in a different order than shown. Therefore, in some embodiments, the receiver conveys data of a horizontal line of the decoded frame to the display device at the completion of insetting each plane intersecting the horizontal line. In such embodiments, the receiver does not wait for decoding and insetting to complete for all horizontal lines of the frame before conveying data to the display device.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors that execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   a transmitter comprising circuitry configured to communicate with a receiver; and
   logic comprising circuitry configured to:
   receive source data corresponding to a scene in a frame to be rendered for display on a display device;
   receive an indication to render the frame as a plurality of planes;
   render, using the source data, the plurality of planes, each plane comprising one or more blocks of a plurality of blocks of the frame corresponding to the scene, and wherein for a given plane of the plurality of planes, a resolution is different than a resolution of one or more other planes of the plurality of planes;
   insert metadata in of each of the plurality of planes, the metadata comprising multi-plane information including a rank for each of the plurality of planes indicative of an order in which the plurality of planes are to be decoded; and
   transmit each of the plurality of planes to a receiver.

2. The apparatus as recited in claim 1, wherein the rank of each of the plurality of planes indicates a relative resolution of a given plane with respect to other planes of the plurality of planes.

3. The apparatus as recited in claim 1, wherein the indication comprises one or more commands to render the frame as a plurality of planes that are generated responsive to identification of at least one of a foveated region, a predicted point of focus, a region with high contrast edges, and a hint from software and/or hardware.

4. The apparatus as recited in claim 1, wherein for a given frame, the transmitter is configured to transmit each plane of the given frame in an order based on resolution beginning with the lowest resolution.

5. The apparatus as recited in claim 1, wherein the logic is further configured to insert, in the multi-plane information, identification and a location in a video frame for each of the plurality of planes.

6. The apparatus as recited in claim 1, wherein the logic is further configured to determine which regions of the frame qualify to be planes based on one or more of a level of contrast of a region, moving objects in a particular region, and objects in a region predicted to be points of focus.

7. The apparatus as recited in claim 1, wherein one or more of the plurality of planes comprises one or more of:
   a foveated region;
   a predicted point of focus; and
   a region comprising high contrast edges.

8. A method, comprising:
   receiving, by logic in a transmitter, source data corresponding to a scene in a frame to be rendered for display on a display device;
   receiving an indication to render the frame as a plurality of planes;
   rendering, by the logic using the source data, each of the plurality of planes, each plane comprising one or more blocks of a plurality of blocks of the frame corresponding to the scene, and wherein for a given plane of the plurality of planes, a resolution is different than a resolution of one or more other planes of the plurality of planes;
   inserting metadata in each of the plurality of planes, the metadata comprising multi-plane information including a rank for each of the plurality of planes indicative of an order in which the plurality of planes are to be decoded; and
   transmitting each of the plurality of planes to a receiver.

9. The method as recited in claim 8, wherein the rank of each of the plurality of planes indicates a relative resolution of a given plane with respect to other planes of the plurality of planes.

10. The method as recited in claim 8, wherein indication comprises one or more commands to render the frame as a plurality of planes that are generated responsive to identification of at least one of a foveated region, a predicted point of focus, a region with high contrast edges, and a hint from software and/or hardware.

11. The method as recited in claim 8, further comprising:
    compressing each of the plurality of planes with a given compression level; and
    separately transmitting each of the plurality of planes via a wireless connection.

12. The method as recited in claim 8, further comprising inserting, in the multi-plane information, identification and a location in a video frame for each of the plurality of planes.

13. The method as recited in claim 8, further comprising determining which regions of the frame qualify to be planes based on one or more of a level of contrast of a region, moving objects in a particular region, and objects in a region predicted to be points of focus.

14. A non-transitory computer readable storage medium storing program instructions, wherein the program instructions are executable by a processor to:
    receive source data corresponding to a scene in a frame to be rendered for display on a display device;
    receive an indication to render the frame as a plurality of planes;
    render, using the source data, the plurality of planes, each plane comprising one or more blocks of a plurality of blocks of the frame corresponding to the scene, and wherein for a given plane of the plurality of planes, a resolution is different than a resolution of one or more other planes of the plurality of planes; and
    insert metadata in of each of the plurality of planes, the metadata comprising multi-plane information including a rank for each of the plurality of planes indicative of an order in which the plurality of planes are to be decoded; and
    transmit each of the plurality of planes to a receiver.

15. The non-transitory computer readable storage medium as recited in claim 14, wherein the rank of each of the plurality of planes indicates a relative resolution of a given plane with respect to other planes of the plurality of planes.

16. The non-transitory computer readable storage medium as recited in claim 14, wherein the indication comprises one or more commands to render the frame as a plurality of planes that are generated responsive to identification of at least one of a foveated region, a predicted point of focus, a region with high contrast edges, and a hint from software and/or hardware.

17. The non-transitory computer readable storage medium as recited in claim 14, wherein the program instructions are executable by a processor to:
   compress each of the plurality of planes with a given compression level; and
   separately transmit each of the plurality of planes via a wireless connection.

18. The non-transitory computer readable storage medium as recited in claim 14, wherein the program instructions are executable by a processor to insert, in the multi-plane information, identification and a location in a video frame for each of the plurality of planes.

19. The non-transitory computer readable storage medium as recited in claim 14, wherein the program instructions are executable by a processor to determine which regions of the frame qualify to be planes based on one or more of a level of contrast of a region, moving objects in a particular region, and objects in a region predicted to be points of focus.

20. The non-transitory computer readable storage medium as recited in claim 14, wherein the program instructions are executable by a processor to:
   decode each of the plurality of planes; and
   inset each of the plurality of planes on any lower resolution planes of the plurality of planes.

* * * * *